Aug. 3, 1965 K. HINRICHS 3,199,043

CURRENT TRANSFORMER AMPLIFIER MULTIPLEXING ARRANGEMENT

Filed Jan. 8, 1962 2 Sheets-Sheet 1

INVENTOR.
KARL HINRICHS
BY
Samuel B. Stone
ATTORNEY

INVENTOR.
KARL HINRICHS
BY
Samuel B. Stone
ATTORNEY

United States Patent Office 3,199,043

Patented Aug. 3, 1965

3,199,043

CURRENT TRANSFORMER AMPLIFIER MULTIPLEXING ARRANGEMENT

Karl Hinrichs, Fullerton, Calif., assignor to Beckman Instruments, Inc., a corporation of California Filed Jan. 8, 1962, Ser. No. 164,844
8 Claims. (Cl. 330—124)

This invention relates to an arrangement for multiplexing a plurality of data channels and more particularly to a multiplexing arrangement employing a plurality of potentiometric amplifiers and switching circuits followed by an operational amplifier and employing current transformers as current-summing nodes of the operational amplifier.

Heretofore multiplexing arrangements including a plurality of data channels have been provided in which each channel includes means for conductively and electrostatically isolating the input of each channel from the output thereof. With such an arrangement, the input of a channel is floating or connected to some point, possible remote, whose potential is variably different from the measurement system central ground, whereas the output of the channel is connected to system central ground. Such schemes utilize an amplifier in the input side of each channel and an amplifier in the output side (grounded side) of each channel. With such arrangements the isolation is provided by transformers which include shields, one of which may be connected to a floating transducer ground lead (not conductively coupled to the output ground lead) on the input side of the channel.

It is desirable to avoid the use of an amplifier on the output side of each channel. This can be accomplished by multiplexing at the input of the amplifier on the floating side. However, this is not feasible for the highest-accuracy system since the ground lead on the floating side also must be switched, including the transformer shields, and there is no satisfactory method of providing a return path for the switch leakage currents when the switches are in the off state. This leakage problem also prevents the use of transistor switches on the secondary of the transformer since on the secondary, current must be switched and no return paths for the leakage current are feasible.

According to a feature of the present ilnvention, a multiplexing arrangement is provided which utilizes current transformer amplifiers which provide high accuracy and high linearity.

A further feature of the present invention is to provide a multiplexing arrangement comprising a plurality of channels in which each of the channels has its input conductively and electrostatically isolated from its output, and which does not require two amplifiers per channel.

An additional feature of this invention is in the provision of a multiplexing arrangement employing a plurality of potentiometric amplifiers followed by an operational amplifier and utilizing current transformers as current-summing nodes of the operational amplifier.

In accordance with the teachings of the present invention, a multiplexing arrangement is provided which includes a plurality of data channels for receiving input signals from transducers, or the like, and for providing output signals which are suitable for digitization. Each channel includes an amplifier connected through a switching circuit to the primaries of its current transformer. Each current transformer has a secondary, and the secondaries of all the current transformers, and hence the outputs of all channels, are connected in parallel and to a single output operational amplifier. The current transformer provides conductive and electrostatic isolation between the input and the output of each channel. Each input amplifier, switching circuit and current transformer, and the output amplifier together function as a current transformer amplifier which, therefore, includes a floating amplifier connected through a switching circuit and a current transformer to an output grounded amplifier. When a channel is being sampled, a switching signal is applied to the switching circuit and the operational amplifier provides at its output a doublet pulse-amplitude-modulated signal suitable for digitization.

The current transformers further provide high linearity. High accuracy is achieved by employing the current transformers as the current-summing nodes of the output amplifier. As is well known in the instrumentation field, a current transformer is capable of considerably greater transformation accuracy than a potential transformer, since the flux in the core of a current transformer is virtually zero with consequent great reduction in the problems attendant to core saturation, hysteresis losses, eddy current losses, magnetizing currents and nonlinear magnetization curves.

An additional feature of this invention is the preservation of accuracy despite slowly varying offsets because of ground-side switches and circuit errors. Since each channel produces a balanced pulse doublet, it is possible to measure both amplitudes, plus and minus, and to average these magnitudes after digitization. Since any offset in grounded amplifier, commutator or digitizer would add to one side and subtract from the other, this averaging technique restores the data accuracy.

Other features and objects of the invention will be better understood from a consideration of the following detailed description when read in conjunction with the attached drawings in which.

Figure 1:
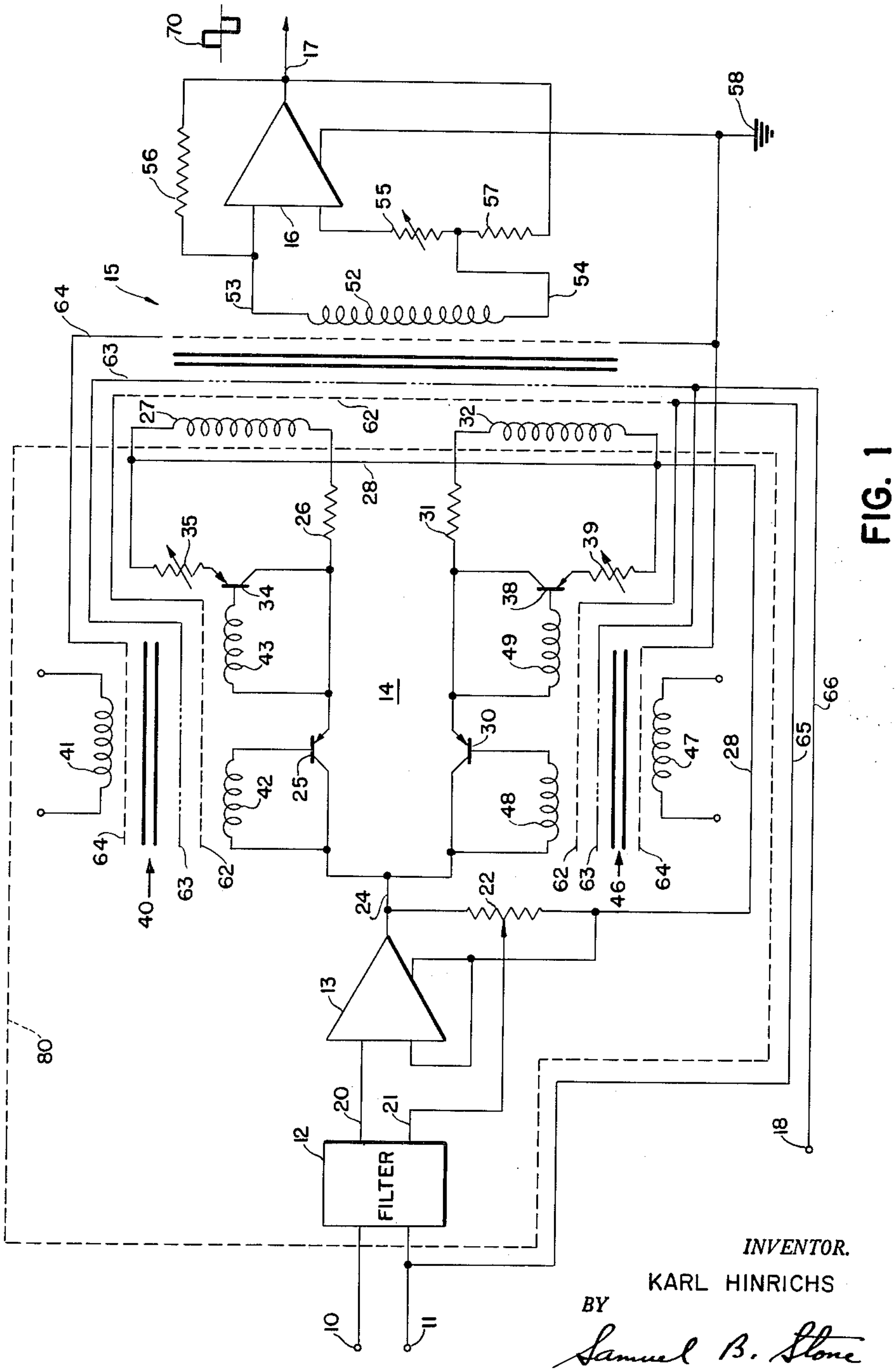
FIG. 1 illustrates a current transformer amplifier which may be employed in the multiplexing arrangement of the present invention.

FIG. 1 illustrates a floating current transformer amplifier 13 driving a current transformer 15 which functions as the current-summing node of a grounded output amplifier 16, replacing the usual conductive resistor array. Input terminals 10 and 11 are connected to a filter 12 which in turn is connected to an input floating amplifier 13. The amplifier 13 is connected through a switching circuit 14 to a current transformer 15. The secondary of the current transformer 15 is connected to an output amplifier 16, the output of which is supplied on an output line 17. A transducer, such as a thermocouple, a strain gauge, a thermistor or the like, may be connected to the input terminals 10 and 11. The shield of the transducer may be connected to an input terminal 18 which in turn is connected to a shield in the current transformer which will be described in greater detail subsequently. The filter 12 may be of conventional construction to provide the desired pass characteristics. The amplifier 13 may be a potentiometric amplifier as shown, or a true differential amplifier or a simple buffer amplifier. A line 20 is connected from the filter 12 to the amplifier 13, and a line 21 is connected from the filter to a variable tap on a gain potentiometer 22 which is connected across the output terminals of the amplifier 13.

The output of the amplifier 13 is connected through a line 24 to the switching circuit 14. The switching circuit 14 comprises a first path including a pnp transistor 25 and a precision summing resistance 26, which in turn is connected through a primary winding 27 of the current transformer 15 and a line 28 back to the gain potentiometer 22. The switching circuit 14 provides a second path including a pnp transistor 30 and a precision summing resistance 31, which in turn is connected through a primary winding 32 of the transformer 15 and the line 28 back to the gain potentiometer 22.

A shorting pnp transistor 34 is connected in series with a trimming resistance 35. The transistor 34 and the trimming resistance 35 are connected across the precision summing resistance 26 and the primary winding 27. A shorting pnp transistor 38 is connected in series with a trimming resistance 39. The transistor 38 and the resistance 39 are connected across the precision summing resistance 31 and the primary winding 32.

The transistors 25 and 34 are operated alternately by means of switching signals applied through a transformer 40. The transformer 40 includes a primary winding 41 and secondary windings 42 and 43. The secondary winding 42 is connected across the base and the collector of the transistor 25. The secondary winding 43 is connected across the base and the collector of the transistor 34. With a given polarity signal on the primary winding 41, the secondary windings 42 and 43 are arranged to turn on one transistor and turn off the other transistor. The switching signals are applied to the primary winding 41 to control the switching rate of the transisors 25 and 34.

The transistors 30 and 38 are operated alternately from switching signals applied through a transformer 46. The transformer 46 includes a primary winding 47 and secondary windings 48 and 49. The secondary winding 48 is connected across the base and the collector of the transistor 30, and the secondary winding 49 is connected across the base and the collector of the transistor 38. The secondary windings 48 and 49 are arranged to turn on one transistor and turn off the other transistor. The switching signals applied to the primary winding 47 are displaced with respect to the switching signals applied to the primary winding 41 for reasons which will be discussed in greater detail subsequently.

The current transformer 15 includes a secondary winding 52 which is connected to the operational amplifier 16. The amplifier 16 is a grounded feedback amplifier with virtually zero input impedance because of its high gain and the feedback resistor 56. The secondary winding 52 is connected through a line 53 to the input of the amplifier 16, and through a line 54 to the junction of a trimming resistance 55 and a resistance 57. A feedback resistance 56 is connected from the output of the amplifier 16 to the input line 53. The resistance 57 is connected from the output of the amplifier to the trimming resistance 55 which in turn is connected to the input of the amplifier 16. The amplifier 16 is grounded at a ground terminal 58.

Since a current transformer operates in the current mode, near zero flux density is maintained in the core. As a result, the operating characteristics of the current transformer are more uniform since it is not operated at a high flux density, or in the nonlinear region. By operating in the current mode, nonlinearities of the magnetic material are reduced to a secondary effect and thereby greater levels of precision are achieved. Current transformers have been utilized for years in the field of instrumentation and their characteristics, construction and operation are well-known to those skilled in the art.

Each of the transformers 15, 40 and 46 preferably includes three shields 62, 63 and 64. The shields 62, termed inner floating guard shields, are connected together and connected through a line 65 to the input terminal 11. The shields 63, termed transducer guard shields, are connected together and connected through a line 66 to the input terminal 18. The input terminal 18 normally is connected to the shield of a transducer, the signal terminals of which are connected to the input terminals 10 and 11. The shields 64, termed system central ground shields or mecca shields, are connected together and connected to the ground terminals 58.

Figure 3:
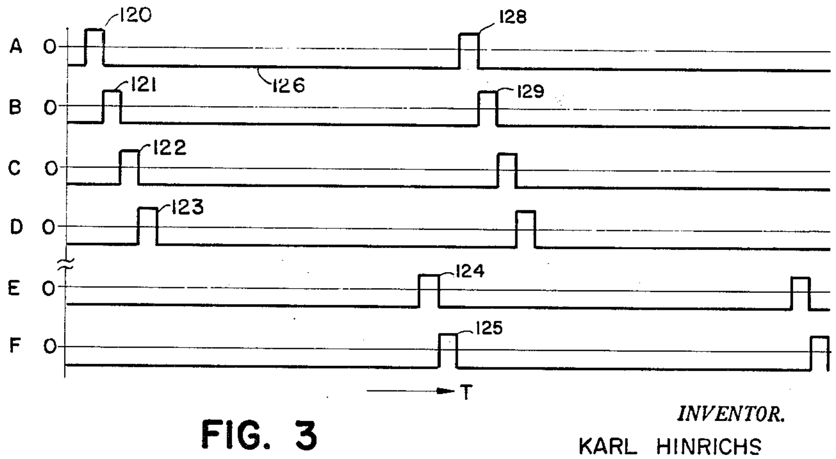
FIG. 3 illustrates exemplary switching signals employed to control the multiplexing arrangement in FIG. 2.

In the operation of the current transformer amplifier shown in FIG. 1, input signals are applied through the filter 12 to the amplifier 13. The output from the amplifier 13 is applied through the switching circuit 14 to the primary winding 27 or to the primary winding 32 depending upon the switching signals applied to the primary windings 41 and 47 of the respective transformers 40 and 46. When a switching signal of a given polarity is applied to the primary winding 41, the output from the amplifier 13 is applied through the transistor 25 to the primary winding 27. When a similar switching pulse is applied to the primary winding 47 of the transformer 46, the output from the amplifier 13 is applied through the transistor 30 to the primary winding 32. Reference may be made to FIG. 3 for exemplary waveforms of switching signals applied to the primary windings 41 and 47. For example, the signals labeled A may be applied to the primary winding 41, and the signals labeled B may be applied to the primary winding 47. The switching circuit 14 is operated first to cause the transistors 25 and 38 to be turned on and the transistors 30 and 34 to be turned off, then to cause the transistors 30 and 34 to be turned on and the transistors 25 and 38 to be turned off. This is accomplished in the case of the transistors 25 and 34, for example, by applying a pulse of one polarity to the primary winding 41 followed by a pulse of the opposite polarity. The inverse of these pulses is applied to the primary winding 41.

If the current transformer amplifier illustrated in FIG. 1 is being operated only as an amplifier and not as a portion of the multiplexing arrangement, the pulses applied to the primary windings 41 and 47 may be 5 kc. alternating pulses with the pulses applied to the primary winding 41 of opposite polarity (out of phase) with respect to those applied to the primary winding 47. If desired, the current transformer may be operated to above 100 kc. if the switching rate of the transistors is sufficiently high. As will become apparent in the discussion of the multiplexing arrangement illustrated in FIG. 2, the channels are sampled sequentially and, therefore, a particular channel is sampled for a short period of time and off for a longer period of time while the remaining channels are sampled. That is, the switching circuit 14 will be operated for one cycle (the transistor 25 being turned on and off, followed by the transistor 30 being turned on and off) and then switched to a quiescent or non-sampling state (both transistors 25 and 30 off and both transistors 34 and 38 on) for a period of time while other channels are being sampled. For example, for a given short period of time (such as $\frac{1}{5000}$ of a second) the transistor 25 is turned on and off, followed by the transistor 30 being turned on and off (at which times the respective transistors 34 and 38 are turned off and on), followed by a longer period of time during which both transistors 25 and 30 are off and both transistors 34 and 38 are on. Reference may be made to FIG. 3 wherein the pulse 120 turns on the transistor 25 and turns off the transistor 34, and a pulse 121 turns on the transistor 30 and turns off the transistor 38. A similar operation occurs when pulses 128 and 129 are applied to respective primary windings 41 and 47. During the interval between the pulses 120 and 128, the transistor 25 is off and the transistor 34 is on. Likewise, between the pulses 121 and 129, the transistor 30 is off and the transistor 38 is on.

Assuming that a switching pulse, such as the pulse 120 in FIG. 3, is applied to the primary winding 41, the transistor 25 is turned on and the transistor 34 is turned off as discussed above. At this time the switching pulse on the primary winding 47 holds the transistor 30 off and the transistor 38 on. The output of the amplifier 13 is applied through the line 24, the transistor 25, the summing resistance 26, the primary winding 27 and the line 28 back to the gain potentiometer 22. The current in the primary winding 27 induces a like current in the secondary winding 52 of the current transformer 15. The current in the secondary winding 52 brings up the output voltage of the amplifier 16 to maintain the input current to the amplifier 16 at zero. This action induces a feedback current through the current transformer, and the feedback current is equal and opposite to that applied to the primary winding 27. Although a one-to-one turns ratio is assumed for purposes of description, any desired turns ratio in the current transformer may be selected as dictated by circuit convenience. The amplifier 16 provides an output pulse on the line 17 during the time the transistor 25 is on, and this output pulse is proportional to the amplitude of the input signal applied to the input terminals 10 and 11. No current is supplied from the amplifier 13 to the primary winding 32 through the off transistor 30 at this time. The transistor 38 functions as a short circuit across the primary winding 32 to drain off any leakage current from the transistor 30, and to assure substantially zero current in the primary winding 32.

When the switching pulse applied to the primary winding 41 terminates, a similar switching pulse, such as the pulse 121 in FIG. 3, is applied to the primary winding 47 to turn on the transistor 30 and to turn off the transistor 38. At this time the transistor 25 is off and the transistor 34 is on. The output from the amplifier 13 is applied through the line 24, the transistor 30, the summing resistance 31, the primary winding 32, and the line 28 back to the gain potentiometer 22. A current is induced in the secondary winding 52 thereby bringing up the output voltage of the amplifier 16 to maintain the input current to the amplifier 16 at zero in the same manner as discussed above. However, the current induced in the secondary winding 52 is in an opposite direction (because the current in the primary 32 is in an opposite direction) and causes an output pulse on the line 17 of a polarity opposite to that produced by the current in the primary winding 27. The transistor switch 34 functions as a short circuit to drain off leakage currents and to assure substantially zero current in the primary winding 27. The transistors 34 and 38 may induce small currents in the respective primary windings 27 and 32, but these currents are minor and cancel during a complete cycle of operation.

The output of the amplifier 16 on the line 17 is a doublet pulse-amplitude-modulated (PAM) signal. This is a 5 kilocycle signal if the switching frequency of the transistors also is 5 kilocycles. The doublet PAM output eliminates the charging current for the transformer. This output is suitable for use with an analog-to-digital converter for digitization. An exemplary output signal for one cycle of operation is illustrated by the reference numeral 70 and includes a positive pulse and a negative pulse. The output signal may be applied to a unipolar ADC which responds to one of the pulses, for example, the positive pulse. Preferably, the positive pulse is added to the negative pulse (added to the negative value of the negative pulse) and divided by two to provide the ultimate output pulse. This latter operation is simple when using a conventional binary analog-to-digital converter and eliminates offset errors.

Figure 2:
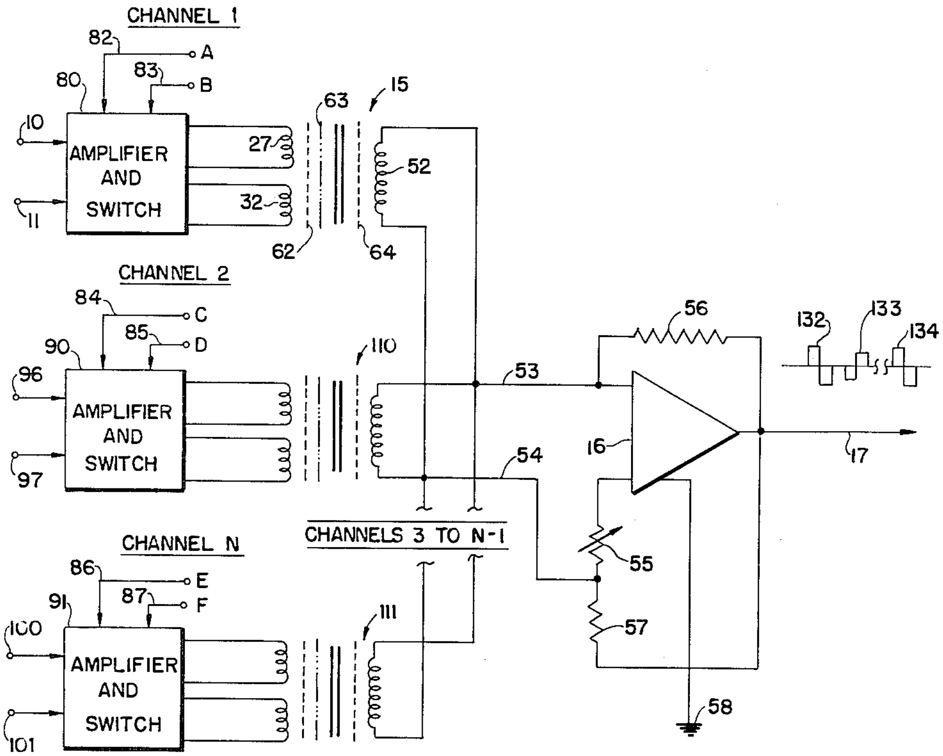
FIG. 2 illustrates in schematic and block diagram form a multiplexing arrangement utilizing current transformer amplifiers.

FIG. 2 illustrates a current transformer amplifier multiplexing arrangement. According to a feature of this invention, a plurality of channels each including an amplifier, a switching circuit and a current transformer are connected to an output amplifier, with the current transformers selectively functioning as current summing nodes of the output amplifier. Each channel includes an input filter, an input amplifier, a switching circuit, and a current transformer like those illustrated in FIG. 1. Channel 1 includes a filter, an amplifier, and a switching circuit which are represented as a single box 80 and identical to the components shown within the dashed line box 80 in FIG. 1. The signal terminals of a transducer may be connected to the input terminals 10 and 11 which in turn are connected to the amplifier and switch 80. Lines 82 and 83 indicate switching signal input lines to the respective transformer primary windings 41 and 47 (FIG. 1). The letters A and B next to the respective lines 82 and 83 indicate the switching signals shown in FIG. 3 which are applied to these lines. Although the connections are not shown for convenience of illustration, the shields 62, 63 and 64 may be connected as in FIG. 1.

The output from the amplifier and switch 80 is connected to the primary windings 27 and 32 of the current transformer 15 in the same manner illustrated in FIG. 1. Likewise, the secondary winding 52 of the current transformer 15 is connected through the lines 53 and 54 to the operational amplifier 16. Channels 2 and N include respective amplifier and switching circuits 90 and 91 which are similar in construction to the amplifier and switch 80 in channel 1. In a like manner, channels 2 and N include respective transducer signal input terminals 96 and 97, and 100 and 101. Also, channels 2 and N include respective current transformer 110 and 111 which are shielded in the same manner as the transformer 15. The secondaries of all of the current transformers 15, 110 and 111 are connected in parallel with the lines 53 and 54 which are connected to the amplifier 16. Additional channels may be connected in a similar manner. The trimming resistance 55 at the input of the amplifier 16 provides substantially zero voltage across the secondary windings to avoid erroneous feed-across (cross-talk) from one channel to another.

In order to illustrate the operation of the multiplexing arrangement illustrated in FIG. 2, ten channels are assumed, i.e. $N=10$. A transducer is connected to the input terminals of each channel. The transducer shields may be connected to the respective transducer guard shields (such as the shield 63 on the transformer 15) of the transformers as discussed previously. Each channel is sampled for a given period of time, such as approximately 1/5000 of a second, and is sampled again after the remaining channels have been sampled. When a channel is sampled, the transistor 25 (FIG. 1) is turned on and the transistor 34 is turned off when the pulse 120 in FIG. 3 is applied to the switching signal line 82 in FIG. 2. When the pulse 120 terminates, the transistor 25 is turned off and the transistor 34 is turned on. The pulse 121 then turns on the transistor 30 and turns off the transistor 38. After the pulse 121 terminates, the transistor 30 turns off and the transistor 38 turns on, the transistors 25 and 30 remaining off and the transistors 34 and 38 remaining on until that particular channel is sampled again. In the case of a 5 kc. switching rate (the pulses 120 and 121 occur in 1/5000 of a second) and ten channels, 1/500 of a second elapses before a channel is sampled again. Hence, in this example each channel is sampled for approximately 1/5000 of a second, is in a quiescent or non-sampled state while the remaining channels are being sampled, and is again sampled in approximately 1/500 of a second. Because certain of the switching pulses are relatively long, it is perferable to employ broadband keying transformer (such as, broadband shielded toroidal transformers) as the transformers 40 and 46 (FIG. 1) to pass the positive and negative switching pulses without allowing either to decay. Assuming that the pulses shown in FIG. 3 are utilized, the negative pulses (such as, a pulse 125) are relatively long and must not be allowed to decay before the following positive pulses occur.

As noted above, FIG. 3 illustrates the switching pulses applied to channels 1, 2 and N for a ten channel ($N=10$) multiplexing arrangement. The switching signals are labeled A through F to correspond to the switching signal inputs A and B, C and D, and E and F of the respective channels 1, 2 and N. The switching signals A and B are applied to the respective input lines 82 and 83 of the amplifier and switch 80 in channel 1. The switching signals C and D are applied to the respective lines 84 and 85 in channel 2, and the switching signals E and F are applied to the respective lines 86 and 87 in channel N. Hence, the pulses 120 and 121 in FIG. 3 cause the channel 1 to be sampled. Channels 2 and N are sampled by respective pulses 122 and 123, and 124 and 125. After all channels have been sampled, the sequence begins again with the occurrence of pulses 128 and 129 which sample channel 1. Referring back to channel 1, it should be noted that the transistor 25 is off and the transistor 34 is on, and the transistor 30 is off and the transistor 38 is on during the period of time between the switch pulses 120 and 128, and 121 and 129, respectively. The same is true of the remaining channels.

An exemplary doublet PAM output signal is shown above the output line 17 in FIG. 2. Assuming that the channels are sampled in sequence, a doublet 132 is proportional to the input signal to channel 1, a doublet 133 is proportional to the input to the channel 2 and a doublet 134 is proportional to the input to the channel N. The doublets 132 and 134 indicate positive transducer input signals and the doublet 133 indicates a negative transducer input signal. There may be some time displacement between the doublet signals as illustrated in FIG. 2 as a result of the time lag between the sampling of the channels.

Although a normal sequential sampling of the channels has been described, it is understood that one or more channels may be supercommutated. That is, one or more channels may be sampled more frequently than the others. For example, channel 1 may be sampled two or more times during the period of time that channels 1 through N are being sampled.

The unique application of current transformers herein described permits the technique of connecting their secondaries in parallel without serious degradation of signal accuracy. Since the amplifier 16 presents virtually zero impedance to the transformer secondaries, the signal voltage across the secondaries is held to a negligibly small value no matter which channel is being sampled and no crosstalk occurs. It should be noted that it is possible, in special systems, to add or subtract two or more floating channels by this invention.

It now should be apparent that the present invention provides a multiplexing arrangement including a plurality of channels each of which includes a current transformer which operates as the current summing node for a single output amplifier. Each channel includes an input amplifier connected through a switching circuit to the primary windings of a current transformer. The secondary windings of all current transformers are connected in parallel to an output operational amplifier. Input signals are applied to the channels from transducers, or the like, and the channels are sampled to provide a doublet pulse-amplitude-modulated output from the output of the operational amplifier.

Although particular components and frequencies of operation have been discussed in connection with a specific example of a multiplexing arrangement constructed in accordance with the present invention, others may be utilized. Furthermore, it will be understood that although an exemplary embodiment of the present invention has been disclosed and discussed, other applications and circuit arrangements are possible and that the embodiment disclosed may be subjected to various changes, modifications, and substitutions without necessarily departing from the spirit of the invention.

What is claimed is:

1. A multiplexing arrangement including a plurality of channels for sampling input signals applied to each of said channels and providing output signals representative of said input signals, the improvement comprising input circuit means in each of said channels having an input for receiving said input signals and having an output, an amplifier in each of said channels having an input connected with the output of said input circuit means and having an output, a switching circuit in each of said channels having an input connected to the output of said amplifier and having two outputs, a current transformer in each of said channels having two inputs connected with said two outputs of said switching circuit and having an output, an operational output amplifier, the outputs of all of the current transformers being connected in parallel and to said operational output amplifier, the current transformers selectively functioning as current summing nodes of the output amplifier, and means connected with each of said switching circuits for receiving input switching signals which control the sampling of said channels.

2. A multiplexing arrangement as in claim 1 wherein each of said switching circuits includes first and second current paths, each of said current transformers includes first and second primary windings and a secondary winding, a first summing resistance and a second summing resistance in each of said channels, the first current path in the switching circuit of each channel being connected through the first summing resistance of each channel to the first primary winding of the current transformer of each channel, and the second current path in the switching circuit of each channel being connected through the second summing resistance of each channel to the second primary winding of the current transformer of each channel, and the secondary windings of the current transformers of all channels being connected in parallel and to the output amplifier.

3. A multiplexing arrangement as in claim 2 wherein each of said current transformers includes at least two shields, a first of which is connected with said input circuit means, and a second of which is connected with the output of said output amplifier.

4. A multiplexing arrangement as in claim 3 wherein said input circuit means includes a filter.

5. A multiplexing arrangement including a plurality of channels for sampling input signals applied to each of said channels to provide output signals comprising an input circuit, an amplifier having an input and an output, a switching circuit and a current transformer in each of said channels, each input circuit including input terminals for receiving input signals and an output connected with the input of the amplifier in each respective channel, the output of each amplifier being connected with the switching circuit in each respective channel, each switching circuit including two selectively switchable current paths and means connected with said paths to control the passage of current therethrough, each current transformer including a pair of primary windings and a secondary winding, a first of said switching paths in each of said channels being connected to the first of said primary windings in each respective channel, the second of said switching paths in each of said channels being connected to the second primary winding in each respective channel, an output amplifier, and the secondary windings of all of said current transformers being connected in parallel and to said output amplifier, said current transformers serving as current summing nodes of the output amplifier.

6. A multiplexing arrangement as in claim 5 wherein each of said current switching paths includes a summing resistance, and each of said switching circuits includes selectively operable shorting means connected with the primary windings of each of said respective current transformers for dissipating undesired currents in said primary windings when the respective current switching paths are not operated to pass current through the respective primary windings.

7. A multiplexing arrangement for sampling input signals and providing output signals representative of the input signals, and including a plurality of channels, the improvement comprising amplifier and switching means in each of said channels for receiving input signals and for selectively providing output signals, means connected with each of said amplifier and switching means for receiving switching signals and controlling the operation of said amplifier and switching means, a current transformer in each channel having at least one primary winding and at least one secondary winding, the primary winding of the current transformer of each channel being connected with the respective amplifier and switching means of each channel, an output amplifier, and the secondary windings of all the current transformers being connected in parallel and to said output amplifier, said current transformers serving as current summing nodes of the output amplifier.

8. A multiplexing arrangement for sampling input data and providing output data representative of the input data, and including a plurality of channels, the improvement comprising first means in each of said channels for receiving input data and for selectively providing output signals, control means connected with each of said first means for receiving control signals and for controlling the operation of said first means, isolation means comprising a current transformer in each channel having an input and an output, the input being connected with said first means for receiving said output signals, an output amplifier for providing said output data, and the outputs of all of said isolation means being connected in parallel and to said output amplifier, and each of said current transformers selectively functioning as a current summing node of the output amplifier.

References Cited by the Examiner

UNITED STATES PATENTS

| | | | |
|---|---|---|---|
| 2,868,881 | 1/59 | Trousdale | 179—15 |
| 2,872,575 | 2/59 | Martin | 328—206 X |

ROY LAKE, *Primary Examiner.*

ARTHUR GAUSS, *Examiner.*